United States Patent
Miyasaka

Patent Number: 5,869,208
Date of Patent: Feb. 9, 1999

[54] LITHIUM ION SECONDARY BATTERY

[75] Inventor: Tsutomu Miyasaka, Kanagawa, Japan

[73] Assignee: Fuji Photo Film Co., Ltd., Kanagawa, Japan

[21] Appl. No.: 812,548

[22] Filed: Mar. 7, 1997

[30] Foreign Application Priority Data

Mar. 8, 1996 [JP] Japan .................................. 8-051177

[51] Int. Cl.$^6$ .................. H01M 4/50; H01M 4/62
[52] U.S. Cl. .................. 429/224; 429/215; 429/216; 429/218; 429/197
[58] Field of Search ............................ 429/48, 126, 215, 429/216, 224, 218, 194, 197, 198, 199, 137

[56] References Cited

U.S. PATENT DOCUMENTS

| | | | |
|---|---|---|---|
| 4,576,883 | 3/1986 | Hope et al. ............................... | 429/215 |
| 5,314,765 | 5/1994 | Bates ....................................... | 429/218 |
| 5,316,877 | 5/1994 | Thackeray et al. ...................... | 429/218 |
| 5,387,479 | 2/1995 | Koksbang ................................ | 429/126 |
| 5,427,872 | 6/1995 | Shen et al. .............................. | 429/142 |
| 5,464,706 | 11/1995 | Dasgupta et al. ....................... | 429/194 |
| 5,478,674 | 12/1995 | Miyasaka ................................ | 429/224 |
| 5,506,077 | 4/1996 | Koksbang ................................ | 429/224 |
| 5,631,104 | 5/1997 | Zhong et al. ............................ | 429/194 |
| 5,705,292 | 1/1998 | Yukita et al. ........................... | 429/137 |

Primary Examiner—Kathryn L. Gorgos
Assistant Examiner—Carol Chaney
Attorney, Agent, or Firm—Sughrue, Mion, Zinn, Macpeak & Seas, PLLC

[57] ABSTRACT

In a lithium ion secondary battery having a positive electrode, a negative electrode, a non-aqueous electrolyte, and a container, the positive electrode is made of a positive electrode active material having a spinel structure and the formula:

$$Li_xMn_{2-a}M_{a/c}O_{4+b}$$

wherein M is cation of a metal other than Li and Mn; x, a and b are $0.1 < x \leq 1.2$, $0 \leq a < 2.0$ (preferably $0 < a < 2.0$), $1 \leq c \leq 3$, and $0 \leq b < 0.3$, during its charge-discharge cycle;

the positive electrode is coated with a non-electron conductive protective layer; and the negative electrode is made of a negative electrode active material of a lithium alloy or an alloy into which a lithium ion can be intercalated.

15 Claims, 1 Drawing Sheet

FIGURE
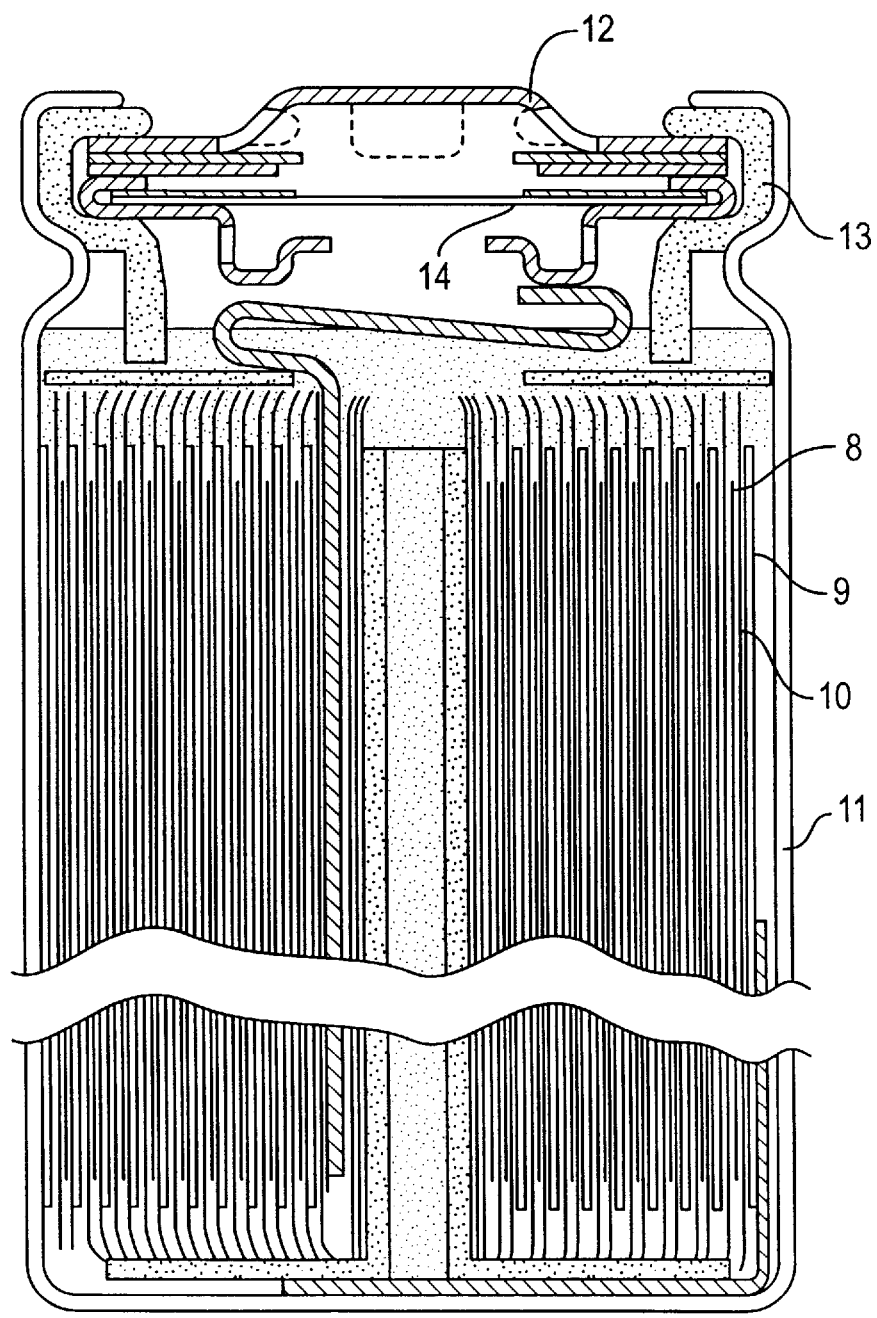

LITHIUM ION SECONDARY BATTERY

FIELD OF THE INVENTION

This invention relates to a lithium ion secondary battery which has a high discharge capacity, a long cycle life, and is improved its safety.

BACKGROUND OF THE INVENTION

A lithium ion secondary battery is known as an advantageous secondary battery which is able to give a high voltage of about 4 volts and a high discharge capacity. As the positive electrode active material of the lithium ion secondary battery, $LiMn_2O_4$ having a spinel crystal structure, as well as $LiMnO_2$, $LiCoO_2$, $LiCo_{1-x}Ni_xO_2$ or $LiNiO_2$ which has a rock salt crystal structure have been generally employed. The $LiCoO_2$ having the rock salt crystal structure shows higher voltage and higher discharge capacity than other oxides and therefore is advantageous. However, the $LiCoO_2$ has such drawbacks that cobalt is economically disadvantageous and less available than other metals, and moreover may cause environmental pollution if battery wastes containing the lithium cobalt oxide are left outside.

Japanese Patent Provisional Publication H3(1991)-147276 proposes a lithium ion secondary battery using $LiMn_2O_4$ of the spinel crystal structure as the material for its positive electrode, that is, cathode. Manganese is economically advantageous and easily available, and moreover scarcely causes environmental pollution. However, $LiMn_2O_4$ gives a charge capacity (corresponding to amount of releasable lithium ions) per unit volume less than $LiCoO_2$ by 10 to 20%. This means that if the $LiMn_2O_4$ is combined with a negative electrode active material of high capacity to prepare a secondary battery, the volume of the $LiMn_2O_4$ (namely, positive electrode active material) to be used should be increased so as to balance its capacity with the high capacity of the negative electrode active material. As a result, the amount of the negative electrode active material encased in a container of a battery should be reduced, and then the battery capacity lowers.

Japanese Patent Provisional Publication H4(1992)-147573 describes a lithium ion secondary battery using $Li_{1+x}Mn_2O_4$ (x>0) as the positive electrode active material precursor in combination with a negative electrode active material precursor such as carbonaceous material. The combination of a positive electrode active material precursor and a negative electrode active material precursor in a container of a battery is electrochemically converted into a positive electrode active material-negative electrode active material combination by electrically charging thus prepared battery so as to release a lithium ion from the positive electrode active material precursor and intercalate the released lithium ion into the negative electrode active material precursor in the container.

U.S. Pat. No. 4,002,492 describes a lithium alloy as a negative electrode active material showing an increased electric capacity per unit volume. The use of a lithium alloy as a negative electrode active material, however, may cause a specific trouble, that is, production of lithium metal dendrite on the surface of the lithium alloy (i.e., negative electrode active material) in the course of charge-discharge cycle (namely, intercalation and release of lithium) with a high current density. The produced lithium metal dendrite may be in contact with a positive electrode and may produce an internal short circuit. Otherwise, the lithium metal dendrite may react with an electrolytic solution to deteriorate the cycle characteristics of the battery.

Japanese Patent Provisional Publication No. 60-86760 describes that the production of lithium metal dendrite can be obviated by replacing aluminum which is used as a binder of lithium metal with an alloy of aluminum and such other metal as magnesium, boron or gallium.

Japanese Patent Publication (examined) No. H7-114124 describes that a metal alloy negative electrode giving less lithium metal dendrite can be produced by forming an alloy of lithium metal with other metal fusible with lithium metal in the presence of a sub-metal which does not form an alloy with lithium.

The lithium metal alloy of the prior art, however, still is not completely free from the production of lithium metal dendrite on the negative electrode. Particularly, when the charge-discharge cycle undergoes with a high electric current density or reaches overcharge, the lithium metal dendrite is apt to appear.

SUMMARY OF THE INVENTION

It is a primary object of the present invention to provide a lithium ion secondary battery which gives a high voltage and high discharge capacity.

It is another object of the present invention to provide a lithium ion secondary battery which is easily prepared without problems attached to the lithium ion secondary battery of prior art.

It is a further object of the invention to provide a lithium ion secondary battery which is assured in its safety even if lithium metal dendrite is produced on the surface of negative electrode of a lithium alloy or an alloy into which a lithium ion can be intercalated.

The invention resides in a lithium ion secondary battery comprising a positive electrode, a negative electrode, a non-aqueous electrolyte, and a container sealing the electrodes and electrolyte therein, wherein the positive electrode comprises a positive electrode active material having a spinel structure and the formula:

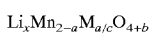

wherein M is cation of a metal other than Li and Mn; x, a and b are numbers satisfying the conditions of $0.1 < x \leq 1.2$, $0 \leq a < 2.0$, $1 \leq c \leq 3$, and $0 \leq b < 0.3$, respectively, during its charge-discharge cycle;

the positive electrode is coated with a non-electron conductive protective layer; and the negative electrode comprises a negative electrode active material of a lithium alloy or an alloy into which a lithium ion can be intercalated.

BRIEF DESCRIPTION OF THE DRAWINGS

The Figure is a schematic section of a typical lithium ion secondary battery according to the invention.

PREFERRED EMBODIMENTS OF THE INVENTION

The preferred embodiments of the lithium ion secondary battery of the invention and the lithium ion secondary battery precursor (which is converted into the lithium ion secondary battery of the invention by an electrochemical process) are set forth below.

1) The lithium ion secondary battery wherein "a" of the formula satisfies the condition of $0 < a \leq 0.1$.

2) The lithium ion secondary battery wherein "x" and "a" of the formula satisfy the conditions of $0.1 < x < 1.0$ and $0 < a \leq 0.1$, respectively.

3) The lithium ion secondary battery wherein "a" of the formula satisfies the condition of $0<a\leq 0.1$, and "M" is cation of a transition metal selected from the group consisting of Co, Ni, Fe, Cr, Cu and Ti.

4) The lithium ion secondary battery wherein "a" of the formula satisfies the condition of $0<a\leq 0.1$, and "M" is cation of a transition metal selected from the group consisting of Zr and Nb.

5) The lithium ion secondary battery wherein "a" of the formula satisfies the condition of $0<a\leq 0.1$, and "M" is a lanthanoid cation.

6) The lithium ion secondary battery wherein "a" of the formula satisfies the condition of $0<a\leq 0.1$, and "M" is cation of an alkali or alkaline earth metal selected from the group consisting of Na, K, Mg, Ca and Cs.

7) The lithium ion secondary battery wherein the non-electron conductive protective layer comprises particles of a metal oxide and a polymer binder.

8) The lithium ion secondary battery wherein the non-electron conductive protective layer comprises particles of a metal oxide selected from the group consisting of aluminum oxide, titanium dioxide and zirconium oxide.

9) The lithium ion secondary battery wherein the negative electrode active material comprises a lithium-containing or non-lithium-containing metal alloy of elements selected from the group consisting of aluminum, magnesium, boron, antimony, bismuth, silicon, germanium, copper, titanium, gallium, and indium.

10) The lithium ion secondary battery wherein the negative electrode active material comprises a metal alloy of lithium and tin.

11) The lithium ion secondary battery wherein the negative electrode active material comprises an amorphous metal.

12) The lithium ion secondary battery wherein the non-aqueous electrolyte comprises a mixed solvent of ethylene carbonate and at least one other carbonate selected from the group consisting of diethyl carbonate and dimethyl carbonate, and a supporting salt comprising $LiPF_6$.

13) The lithium ion secondary battery wherein the container is in the form of a cylinder.

The positive electrode active material precursor of the invention is a metal oxide having the specific formula and the spinel crystal structure, which gives a high voltage.

The metal oxide of spinel type has a crystal structure of $A(B_2)O_4$, in which oxygen anions are arranged at the tops of tetragonal and hexagonal planes of the cubic close-packed structure. According to the arrangements of the cation "A", the spinel structures are classified into a regular (or normal) spinel, that is, $A(B_2)O_4$, and a reverse spinel, that is, $A(A,B)O_4$. There is an intermediate spinel structure, that is, $A_xB_y(A_{1-x},B_{1-y})O_4$. A representative lithium manganese oxide of the regular spinel is $LiMn_2O_4$. In this structure, a half of Mn cations are trivalent and another half are tetravalent. $\lambda$-$MnO_2$, that is a known active material, has the crystal structure of $LiMn_2O_4$ from which lithium is removed, that is called a defective spinel structure, as is described in U.S. Pat. No. 4,246,253. In this crystal structure, all Mn cations are all tetravalent. The lithium manganese oxide employed in the invention can have any spinel structures, such as regular spinel, reverse spinel, intermediate spinel, and defective spinel which may have a spinel crystal structure of non-stoichiometric composition.

The secondary battery of the invention preferably gives such a high input voltage as 4 volts. Therefore, the positive electrode active material of the battery should have an elementary formula of $Li_yMn_2O_4$ ($0<y\leq 1.2$) and should keep the crystal of spinel structure and cubic system during the charge-discharge cycles. If the lithium content increases to exceed the degree of y=1.2, the crystal system turns into a tetragonal system and the voltage to Li decreases to 3.5 volts or lower.

In more detail, the positive electrode active material should have a spinel structure and the stoichiometric or non-stoichiometric formula:

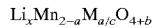

$$Li_xMn_{2-a}M_{a/c}O_{4+b}$$

wherein M is cation of a metal other than Li and Mn; x, a and b are numbers satisfying the conditions of $0.1<x\leq 1.2$, $0\leq a<2.0$, $1\leq c\leq 3$, and $0\leq b<0.3$, respectively.

"M" is a dope element for manganese (Mn) and preferably is a trivalent or tetravalent transition metal element. The dope element of "M" is preferably incorporated into the positive electrode active material, because it improves the cycle characteristics (i.e., cycle life) and storage stability of the positive electrode active material. Preferred examples of the dope element of "M" are transition metals such as Co, Ni, Fe, Cr, Cu and Ti. The dope ratio of "M" to Mn, namely, "a/c", depends on the oxidation number of "M". The "a/c" preferably is a number under the condition that the oxidation number of "Mn" is in the range of 3.5 to 4.0. The amount, namely the dope ratio, of "M" to Mn preferably is low so as not to decrease the capacity of the positive electrode active material. Therefore, "a" preferably satisfies the condition of $0<a\leq 0.1$, more preferably $0<a\leq 0.05$. Preferred metals other than transition metals are Zr, Nb and Y which also improve the storage stability of the active material. Also preferred are lanthanoid elements such as La, Sm and Eu, which improve the storage stability of the active material. The cycle life and storage stability are improved by addition of a small amount of an alkali or alkaline earth metal such as Na, K, Ca and Mg.

The positive electrode active material can keep such a high voltage of 3.7 to 4.3 V to Li in its discharge stage, when the lithium content "x" in the formula of $Li_xMn_{2-a}M_{a/c}O_{4+b}$ is maintained within 0.1 and 1.0 (namely, $0.1<x<1.0$), preferably within 0.1 and 0.9, inclusive (namely, $0.1<x\leq 0.9$).

Hereinbelow, processes for preparing the positive electrode active material precursor of the aforementioned formula are described.

The lithium manganese oxide of the above-mentioned formula, i.e., $Li_eMn_{2-a}M_{a/c}O_{4+b}$, can be produced by a conventional method such as a solid-phase reaction of a lithium salt, a manganese salt or a manganese oxide, and optionally other metal salt or oxide at an elevated temperature. If lithium carbonate and manganese dioxide are employed, the reaction can be performed at a temperature of 350° to 900° C., preferably 350° to 500° C., for a period of 8 to 48 hours. If lithium hydroxide and manganese dioxide are employed, the reaction can be performed at a temperature of 350° to 800° C., preferably 400° to 750° C., for a period of 8 to 48 hours. If lithium nitrate (having a low melting point of 261° C.) is employed, the reaction temperature can be in the range of 300° to 900° C., preferably 300° to 500° C. Examples of employable manganese oxides include $\lambda$-$MnO_2$, $MnO_2$ produced by electrolytic synthesis (EMD), chemically produced $MnO_2$ (CMD), and their mixtures. As a raw material for the lithium component, a lithium manganese oxide (such as $Li_2Mn_4O_9$) also can be employed. The lithium manganese oxide can be mixed with a manganese compound such as manganese dioxide and fired at a temperature of 350° to 500° C.

The molar ratio Li/Mn in the positive electrode active material to be incorporated into the battery generally is in the range of 0.9/2.0 to 1.1/2.0, and preferably is in the range of 1.0/2.0 to 1.05/2.0.

The lithium manganese oxide of the invention can be employed in combination with one or more of other lithium manganese oxides such as $LiMnO_2$ of the rock salt crystal structure and $Li_{1+x}Mn_2O_4$ ($0 \leq x \leq 0.5$, which is produced by chemically inserting Li ion into $LiMn_2O_4$), and $Li_{1-x}Mn_2O_4$ ($0 \leq x \leq 0.5$, which is produced by chemically removing Li ion from $LiMn_2O_4$).

The lithium manganese oxide produced as above preferably is a crystalline product, but may be a low crystalline or amorphous product. Otherwise, a mixture of a crystalline product and an amorphous product can be employed.

The lithium manganese oxide can be employed further in combination with a lithium-containing transition metal oxide which serves as sub-active material. An preferred example of the sub-active material is lithium cobalt oxide ($Li_xCoO_2$, $0.5 \leq x \leq 1$, which gives a high voltage and a high electric capacity). Also preferred is lithium cobalt-nickel oxide ($Li_xCo_yNi_zO_2$, $0.5 < x \leq 1$, $0 \leq y \leq 1$, $0 < z \leq 1$, provided that y+z is not 0). The sub-active material may be a solid solution made of cobalt, other transition metal elements, non-transition metal elements, alkali metals, and/or lanthanoids.

The sub-active material can be employed in combination with the lithium manganese-metal complex oxide in the weight ratio of 2/8 to 1/9 (former/latter), preferably 3/7 to 7/3.

In the following Table 1, the preferred compositions of the positive electrode active materials and the corresponding precursors are set forth in terms of their chemical compositions. These compositions should not be construed to restrict the present invention.

TABLE 1

| No. | Composition of Precursor | Variation of Composition of Active Material |
| --- | --- | --- |
| 1 | $Li_{1.01}Mn_{2.0}O_4$ | $Li_{0.1-0.9}Mn_{2.0}O_4$ |
| 2 | $Li_{1.01}Mn_{1.8}Co_{0.2}O_4$ | $Li_{0.1-0.9}Mn_{1.8}Co_{0.2}O_4$ |
| 3 | $Li_{1.02}Mn_{1.9}Co_{0.03}O_4$ | $Li_{0.1-0.9}Mn_{1.9}Co_{0.03}O_4$ |
| 4 | $Li_{1.02}Mn_{1.8}Co_{0.07}O_4$ | $Li_{0.1-0.9}Mn_{1.8}Co_{0.07}O_4$ |
| 5 | $Li_{1.0}Mn_{1.9}Fe_{0.1}O_4$ | $Li_{0.1-0.9}Mn_{1.9}Fe_{0.1}O_4$ |
| 6 | $Li_{1.01}Mn_{1.9}Fe_{0.05}O_4$ | $Li_{0.1-0.9}Mn_{1.9}Fe_{0.05}O_4$ |
| 7 | $Li_{1.01}Mn_{1.9}Cr_{0.05}O_4$ | $Li_{0.1-0.9}Mn_{1.9}Cr_{0.05}O_4$ |
| 8 | $Li_{1.01}Mn_{1.95}Cr_{0.05}O_4$ | $Li_{0.1-0.9}Mn_{1.95}Cr_{0.05}O_4$ |
| 9 | $Li_{1.0}Mn_{1.9}Cu_{0.05}O_4$ | $Li_{0.2-0.9}Mn_{1.9}Cu_{0.05}O_4$ |
| 10 | $Li_{1.01}Mn_{1.9}Cu_{0.1}O_4$ | $Li_{0.2-0.9}Mn_{1.9}Cu_{0.1}O_4$ |
| 11 | $Li_{1.0}Mn_{1.85}Ni_{0.07}O_4$ | $Li_{0.2-0.9}Mn_{1.85}Ni_{0.07}O_4$ |
| 12 | $Li_{1.0}Mn_{1.85}Ni_{0.15}O_4$ | $Li_{0.2-0.9}Mn_{1.85}Ni_{0.15}O_4$ |
| 13 | $Li_{1.0}Mn_{1.95}Ti_{0.05}O_4$ | $Li_{0.2-0.9}Mn_{1.95}Ti_{0.05}O_4$ |
| 14 | $Li_{1.02}Mn_{1.95}Ti_{0.02}O_4$ | $Li_{0.2-0.9}Mn_{1.95}Ti_{0.02}O_4$ |
| 15 | $Li_{1.0}Mn_{1.95}Zr_{0.05}O_4$ | $Li_{0.2-0.9}Mn_{1.95}Zr_{0.05}O_4$ |
| 16 | $Li_{1.02}Mn_{1.95}Zr_{0.02}O_4$ | $Li_{0.2-0.9}Mn_{1.95}Zr_{0.02}O_4$ |
| 17 | $Li_{1.02}Mn_{1.95}Nb_{0.05}O_4$ | $Li_{0.2-0.9}Mn_{1.95}Nb_{0.05}O_4$ |
| 18 | $Li_{1.02}Mn_{1.95}Nb_{0.02}O_4$ | $Li_{0.2-0.9}Mn_{1.95}Nb_{0.02}O_4$ |
| 19 | $Li_{1.0}Mn_{1.95}Y_{0.05}O_4$ | $Li_{0.2-0.9}Mn_{1.95}Y_{0.05}O_4$ |
| 20 | $Li_{1.0}Mn_{1.95}Y_{0.02}O_4$ | $Li_{0.2-0.9}Mn_{1.95}Y_{0.02}O_4$ |
| 21 | $Li_{1.0}Mn_{1.95}Al_{0.05}O_4$ | $Li_{0.2-0.9}Mn_{1.95}Al_{0.05}O_4$ |
| 22 | $Li_{1.0}Mn_{1.95}Al_{0.02}O_4$ | $Li_{0.2-0.9}Mn_{1.95}Al_{0.02}O_4$ |
| 23 | $Li_{1.0}Mn_{1.97}Na_{0.03}O_4$ | $Li_{0.2-1.0}Mn_{1.97}Na_{0.03}O_4$ |
| 24 | $Li_{1.0}Mn_{1.97}K_{0.03}O_4$ | $Li_{0.2-1.0}Mn_{1.97}K_{0.03}O_4$ |
| 25 | $Li_{1.0}Mn_{1.97}Mg_{0.03}O_4$ | $Li_{0.2-1.0}Mn_{1.97}Mg_{0.03}O_4$ |
| 26 | $Li_{1.0}Mn_{1.97}Ca_{0.03}O_4$ | $Li_{0.2-1.0}Mn_{1.97}Ca_{0.03}O_4$ |
| 27 | $Li_{1.0}Mn_{1.97}Cs_{0.03}O_4$ | $Li_{0.2-1.0}Mn_{1.97}Cs_{0.03}O_4$ |
| 28 | $Li_{1.0}Mn_{1.92}La_{0.04}O_4$ | $Li_{0.2-1.0}Mn_{1.92}La_{0.04}O_4$ |
| 29 | $Li_{1.0}Mn_{1.92}Ce_{0.08}O_4$ | $Li_{0.2-1.0}Mn_{1.92}Ce_{0.08}O_4$ |
| 30 | $Li_{1.0}Mn_{1.92}Nd_{0.04}O_4$ | $Li_{0.2-1.0}Mn_{1.92}Nd_{0.04}O_4$ |
| 31 | $Li_{1.0}Mn_{1.92}Sm_{0.04}O_4$ | $Li_{0.2-1.0}Mn_{1.92}Sm_{0.04}O_4$ |
| 32 | $Li_{1.0}Mn_{1.92}Eu_{0.04}O_4$ | $Li_{0.2-1.0}Mn_{1.92}Eu_{0.04}O_4$ |

There is no specific limitation with respect to the lithium alloy or alloy into which a lithium ion can be intercalated, which is the negative electrode active material of the lithium ion secondary battery of the invention. However, a metal alloy produced by fusing two or more metals which is reduced in the tendency of production of lithium metal dendrite is preferably employed. An amorphous alloy is also preferably employed. Preferred examples are lithium alloys which comprise Al, Al-Mn (U.S. Pat. No. 4,820,599), Al-Mg (Japanese Patent Provisional Publication 57-98977), Al-Sn (Japanese Patent Provisional Publication 63-4742), Al-In, Al-Cd (Japanese Patent Provisional Publication H1-144573), Li-Ag (Japanese Patent Provisional Publication H7-296811), and a mixture of two or more metal alloys (Japanese Patent Publication (examined) H7-114124). Lithium alloy comprising carbon (Japanese Patent Provisional Publication H7-307154) is also employed. Examples of the amorphous lithium alloys are described in Japanese Patent Provisional Publication H7-296812 and J. J. Houser, Phys. Rev. B, 11(10), 3860 (1975). Most preferred are Mg-containing lithium alloys. The Mg-containing lithium alloys are further described in A. Anani, R. A. Huggins, J. Power Source, 38, 363(1992).

The metal alloy to be employed as the negative electrode active material may be in the form of a lithium alloy when it is incorporated into a battery container. Otherwise, the metal alloy may not contain lithium metal when the alloy is incorporated into a battery container, and then lithium ion is electrochemically intercalated into the metal alloy in the container in advance of initiating charge-discharge cycle. The lithium ion source can be lithium contained in the positive electrode active material or lithium metal deposited either on the positive electrode or negative electrode.

Examples of the metal alloy employed as the negative electrode active material of the secondary battery of the invention include Li-Al, Li-Al-Mg, Li-Bi, Li-Al-Ga, Li-Al-Mn, Li-Si, Li-B, Li-Sb, Li-Zn, Li-Ag, Li-In, Li-Pb, Li-Ge, Li-Sn, Li-Ca, Li-Zn-C, Li-Mg-C, Li-Pb-C, Li-Ge-C, Li-Sn-C, Li-Al-C, Li-Sn-B, Li-Sn-Ge, Li-Si-Sn, Li-Sn-Ti, Li-Al-Mo, Li-Al-W, Li-Al-Cu, and fused mixtures of the above-mentioned lithium metal alloys.

Metal alloys which are given by removing Li from the above-listed lithium metal alloys are also favorably employed in the invention. Into these lithium-free metal alloy the lithium ion can be electrochemically intercalated in the battery container.

The negative electrode active material or its precursor can be amorphous when it is incorporated into the battery container. The term of "amorphous" means to include a solid solution having poor regularity of lattice structure and/or incomplete crystallinity. For instance, material giving a broadly scattered peak in the region of 20° or more in terms of 2θ value (obtained X ray diffraction method using Cu-Kα rays) is included in the amorphous material. The amorphous material may have a diffraction peak in the scattered peak.

The lithium alloy or metal alloy to which a lithium ion can be intercalated can be employed in combination with other negative electrode active material such as carbonaceous material which can receive and release a lithium ion or lithium metal.

The positive electrode of the lithium ion secondary battery of the invention should be coated with a non-electron conductive (or electro-insulative) protective layer so that the surface of the positive electrode can be kept from lithium metal dendrite which may be produced on the negative electrode. The protective layer preferably keeps the positive electrode active material from contact with the electrolytic solution. Therefore, the protective layer differs from a separator which is generally arranged between the positive electrode and the negative electrode. The protective layer is preferably made of an electro-insulative inorganic or organic material. Examples of the electro-insulative inorganic material include alumina, boron oxide, calcium oxide, titanium dioxide, zirconium oxide, barium oxide, magnesia, mullite, forsterite and silica. Examples of the electro-insulative organic material include polymers such as tetrafluoroethylene and polyamide. Alumina, titanium dioxide and zirconium oxide are most preferred from the viewpoint of electrochemical stability and coating characteristics. The electro-insulative material preferably is in the form of particles. The particles preferably have a mean size of 0.1 to 20 m$\mu$, more preferably 0.2 to 10 m$\mu$. A mixture of particles having broadly varying sizes is preferably used. For instance, particles having a mean size of 0.1 to 1 m$\mu$ and particles having a mean size of 1 to 10 m$\mu$ can be used in combination. A polymer latex is also preferably employed.

The protective layer is preferably formed on the surface of the positive electrode by coating a mixture of particles of the electro-insulative material and a small amount of a binder or a coating aid. Examples of the binder are those which are hereinafter described for the formation of the positive electrode active material. An example of the coating aid is carboxymethyl cellulose (CMC). A surface active agent or other additives can be incorporated into the coating mixture. The protective layer preferably comprises not less than 70 weight %, preferably 85 to 99 weight %, more preferably 90 to 98 weight % of the non-electron conductive organic or inorganic particles. The protective layer should have small openings or voids to allow passage of lithium ion. The void volume preferably is 10 to 60%, more preferably 15 to 50%. The protective layer preferably neither absorb nor release lithium ions. The protective layer can be coated on the positive electrode active material by simultaneous double coating, when the positive electrode active material is coated on a collector.

The protective layer can be coated on the positive electrode by other methods such as spattering or vacuum deposition.

The protective layer generally has a thickness of 0.5 to 50 $\mu$m, preferably 1 to 20 $\mu$m, more preferably 2 to 10 $\mu$m. The protective layer should not decompose at such an elevated temperature as 300° C. which occurs in the battery in the course of manufacture of the battery.

The lithium ion secondary battery of the invention can be manufactured in the conventional way using the materials described above. In manufacturing the secondary battery, other materials and elements can be further incorporated together with the electrode materials and the electrolytic solution.

The lithium ion secondary battery of the invention can be manufactured to give secondary batteries in various types such as cylinder, coin, button, sheet, and square.

Figure in the attached drawing, a lithium ion secondary battery of a representative cylinder type is illustrated, in which 11 denotes a container of battery (i.e., battery can which also serves as a terminal of negative electrode); 8 and 9 denote a positive electrode sheet and a negative electrode sheet, respectively; 10 denotes a separator for separating the positive electrode sheet 8 and the negative electrode sheet 9; 13 denotes a gasket; 12 denotes a cap (i.e., battery cap which also serves as a terminal of positive electrode); and 14 denotes a safety valve. The positive electrode sheet 8 and the negative electrode sheet 9 are combined via the separator 4 and wound together spirally.

Each of the positive electrode sheet and the negative electrode sheet can be prepared by coating a mixture of the materials for the preparation of the electrode active material precursor such as the lithium manganese-metal complex oxide, electroconductive material, binder, and filler on a collector. The mixture is generally called "electrode mixture". The mixture is coated on the collector in the form of a solution and then dried.

Examples of the electroconductive materials are electroconductive materials which are chemically stable in the battery and include naturally produced graphites such as flake graphite, massive graphite, synthetic graphite, carbon black, acetylene black, ketchen black, carbonaceous fibers, powder of metal (e.g., copper, nickel, aluminum, or silver), metal fibers, and polyphenylene derivatives. These materials can be employed singly or in combination. Particularly preferred is a combination of graphite and acetylene black. The amount of the electro-conductive material incorporated into the electrode material is generally not more than 50 wt. %, preferably 1 to 50 wt. %, more preferably 2 to 30 wt. %. When carbon or graphite is employed, its amount preferably is in the range of 2 to 15 wt. %.

The positive electrode active material (or its precursor) and the negative electrode active material (or its precursor) preferably are in the form of particles having a mean diameter of 0.03 to 50 $\mu$m, more preferably 0.1 to 20 $\mu$m. The mean diameter corresponds to a mode diameter representing the maximum frequency point which is determined, for instance, by preparing an average value of values determined by microscopic observation or by measurement utilizing an apparatus for measuring particle size distribution. The active materials preferably have a specific surface area of 0.1 to 50 m$^2$/g. The positive electrode active material or its precursor preferably has a specific surface area of 1 to 10 m$^2$/g.

Examples of the binders include polysaccharides, thermoplastic resins, and elastic polymers, such as starch, polyvinyl alcohol, carboxymethyl cellulose, hydroxypropyl cellulose, regenerated cellulose, diacetyl cellulose, polyvinyl chloride, polyvinyl pyrrolidone, tetrafluoroethylene, polyfluorinated vinylidene, polyethylene, polypropylene, ethylene-propoylene-diene terpolymer (EPDM), sulfonated EPDM, styrene-butadiene rubber, polybutadiene, fluorinated rubber, and polyethylene oxide. These materials can be employed singly or in combination. The amount of the binder preferably is in the range of 2 to 30 wt. %.

Examples of the fillers are any fibrous materials which are chemically stable in the battery and include fibers of olefin polymers such as polypropylene and polyethylene, glass material and carbonaceous materials. The filler can be included in an amount of not more than 30 wt. %.

The electrode mixtures for the positive and negative electrodes can further contain an electrolytic solution and/or a supporting salt. For instance, an ion conductive polymer, nitromethane, and/or an electrolytic solution can be incorporated.

The electric collector comprises an electro-conductive material which is chemically stable in the battery. Examples of the collectors for positive electrode include sheets of stainless steel, nickel, aluminum, titanium, fired carbon, and sheet of aluminum or stainless steel which is plated with carbon, nickel, titanium or silver. Examples of the collectors for negative electrode include sheets of stainless steel, nickel, copper, titanium, aluminum, fired carbon, sheet of copper or stainless steel which is plated with carbon, nickel, titanium or silver, and Al-Cd alloy. The collectors can be oxidized on their surfaces. The collectors can be made in various forms such as sheet, foil, film, net, punched sheet, porous body and sheet, and combined fibers (fibrous mass). The thickness of the collector generally is in the range of 5 to 100 $\mu$m.

The electrolyte solution comprises a non-protonic organic solvent and a lithium salt (namely, electrolyte) soluble in the solvent. Examples of the organic solvents include propylene carbonate, ethylene carbonate, butylene carbonate, dimethyl carbonate, diethyl carbonate, γ-butylolactone, 1,2-dimethoxyethane, tetrahydrofuran, 2-methyltetrahydrofuran, dimethyl sulfoxide, 1,3-dioxolane, formamide, dimethyl formamide, dioxolane, acetonitrile, nitromethane, methyl formate, methyl acetate, phosphoric triester, trimethoxymethane, dioxolane derivatives, sulforane, 3-methyl-2-oxazolidinone, propylene carbonate derivatives, tetrahydrofuran derivatives, diethyl ether, and 1,3-propane sultone. These solvents can be employed singly or in combination. Examples of the lithium salts include $LiClO_4$, $LiBF_6$, $LiPF_6$, $LiCF_3SO_3$, $LiCF_3CO_2$, $LiAsF_6$, $LiSbF_6$, $LiB_{10}Cl_{10}$, lithium salts of lower aliphatic carboxylic acids, $LiAlCl_4$, LiCl, LiBr, LiI, chloroborane lithium, and lithium tetraphenylborate. These lithium salts can be employed singly or in combination.

Preferred is an electrolytic solution of $LiCF_3SO_3$, $LiClO_4$, $LiBF_4$ and/or $LiPF_6$ in a mixture of propylene carbonate or ethylene carbonate with 1,2-dimethoxyethane and/or diethyl carbonate. In the mixture, propylene carbonate or ethylene carbonate is mixed with 1,2-dimethoxyethane and/or diethyl carbonate preferably in the ratio of 0.4/0.6 to 0.6/0.4. 1,2-dimethoxyethane and diethyl carbonate are preferably mixed in a ratio of 0.4/0.6 to 0.6/0.4. The concentration of the electrolyte preferably is in the range of 0.2 to 3 moles per one liter of the electrolytic solution.

The electrolytic solution can contain one or more organic solid electrolytes. Examples of the employable organic solid electrolyte include polyethylene oxide derivatives, polymers having polyethylene oxide unit, polypropylene oxide derivatives, polymers having polypropylene oxide unit, polymers having ion releasable group, a mixture of a polymer having ion releasable group and the aforementioned non-protonic electrolyte, and phosphoric ester polymers. The electrolytic solution may contain polyacrylonitrile. Also known is a combination of inorganic and organic solid electrolytes, as described in Japanese Patent Provisional Publication No. 60(1985)-1768.

The electrolytic solution can further contain one or more materials mentioned below, for improving charge-discharge characteristics: pyridine, triethyl phosphite, triethanolamine, cyclic ethers, ethylene diamine, n-glyme, triamide hexaphosphate, nitrobenzene derivatives, sulfur, quinoneimine dyes, N-substituted oxazolidinone, N,N'-substituted imidazolidinone, ethylene glycol dialkyl ether, quaternary ammonium salts, polyethylene glycol, pyrrole, 2-methoxyethanol, aluminum trichloride, electroconductive polymer, monomers of electrolyte active materials, triethylene phosphoneamide, trialkylphosphine, morpholine, aryl compounds having carbonyl group, hexamethylphosphoric triamide, 4-alkylmorpholine, bicyclic tertiary amines, oils, quaternary phosphonium salts, and tertiary sulfonium salts. A halogen-containing solvents such as carbon tetrachloride or trifluorinated chlorinated ethylene can be incorporated into the electrolytic solution so as to render the battery incombustible. Carbon dioxide gas may be incorporated into the electrolytic solution to improve the battery in its resistance in high temperature storage.

The separator is an electro-insulating thin film having a high ionic permeation rate and an appropriate physical strength. For instance, a sheet or non-woven sheet made of an olefinic polymer such as polypropylene and polyethylene, or glass fiber can be employed. The pore sizes of the separator generally is in the range of 0.01 to 200 μm, preferably 0.01 to 10 μm. The thickness of the separator generally is in the range of 5 to 300 μm, preferably 5 to 30 μm. If a solid electrolytic material such as polymer is employed as the electrolyte, the electrolyte can serve as the separator, and no separator is required.

The surface of the positive electrode active material can be modified. For instance, the surface of the lithium manganese oxide is treated with an esterifying agent or a chelating agent or coated with an electro-conductive polymer or polyethylene oxide. The surface of the negative electrode active material can be also modified, for instance, by coating its surface with an ion conductive polymer or a polyacetylene layer or treated with a lithium salt.

The electrode mixture can be processed to give pellets. In the manufacture of the secondary battery of cylinder, coin or square, the electrode mixture is coated on the collector, dehydrated, dried, pressed, and heated to 150° to 300° C. to give a sheet. The pressed dry sheet preferably has a thickness of 10 to 500 μm.

The lithium ion secondary battery (i.e., non-aqueous lithium ion secondary battery) of the invention can be utilized in various products and devices. Examples are handy personal computers (color or monochromatic), personal computers for imputing with pen, palm-top personal computers, note-type word processors, handy word processors, players for electronically playable book, handy phones, cordless phones (separated phones), pagers, handy terminals, handy facsimiles, handy copying machines, handy printers, head-phone stereos, video movies, liquid crystal television sets, handy cleaners, potable CD players, mini-disk players, electric shavers, electronic interpreters, phones for automobiles, transceivers, electrically actuatable tools, electronic pocket notes, electronic calculators, memory cards, tape recorders, radio sets, and back-up electric sources. The secondary battery is also employable for motor cars, electric cars, motors, illuminating devices, toys, machines for amusement game, road conditioners, iron devices, watches, strobes, cameras, medical equipments (pace makers, hearing aids, massaging devices). The secondary battery is further employable in the fields of space technology and military area. The secondary battery can be employed in combination with other electric sources such as solar battery.

The present invention is further described in the following non-limitative examples.

Preparation of Negative Electrode Sheet (1) Li-Mg-Sn ($Li_2MgSn$) alloy (Alloy A-1)

In a high purity argon gas atmosphere, a powdery mixture of lithium, magnesium and tin (Li:Mg:Sn=2:1:1, molar ratio) was heated to 500° C. in an alumina crucible to fuse the mixture to give an alloy. The resulting alloy ($Li_2MgSn$) was pulverized and pressed on both sides of a copper electric collector (thickness: 15 μm) having a surface with a fine uneven pattern, by means of a press roll. The collector with the pressed alloy layer was heated to 800° C. for 3 hours to give a negative electrode sheet having a thickness of 75 μm (including thickness of both lithium metal alloy layer).

(2) $Li_{2.0}$-Mg-$Ge_{0.5}$-$Sn_{0.5}$ (Alloy A-2)

$Li_{2.0}$-$Al_{0.9}$-$Mg_{0.1}$ (Alloy A-3)

$Li_{3.8}$-Si (Alloy A-4)

$Li_{3.0}$-Bi (Alloy A-5)

$Mg_{2.0}$-Si (Alloy A-6)

Si-$B_{6.0}$ (Alloy A-7)

In the same manner as above, Li-containing alloys (A-2, A-3, A-4, and A-5) and Li-free alloys (A-6 and A-7) were prepared, and their negative electrode sheets were obtained.

(3) Carbonaceous material (Carbon)

A carbonaceous material (Mesocarbon Microbeads, BET specific surface area: 1 m$^2$/g), acetylene black (2 wt. %) and polyvinylidene fluoride (PVDF, binder, 10 wt. %) are kneaded in an organic solvent to give a coating mixture. The coating mixture was coated on both sides of a copper foil collector (thickness: 10 $\mu$m) and dried to give a negative electrode sheet for comparison.

Preparation of Positive Electrode Sheet (1) $Li_{1.02}Mn_{1.95}Co_{0.05}O_4$ of spinel crystal structure (Compound C-1)

Electrolytically synthesized manganese dioxide (EMD, particle size: 5 to 50 $\mu$m, BET specific surface area: 40–70 m$^2$/g, containing less than 1 wt. % of $Mn_2O_3$ and $Mn_3O_4$, and less than 3 wt. % of sulfates and water), cobalt carbonate and lithium carbonate (which were beforehand pulverized to give a mean particle size of 1–10 $\mu$m) were mixed in a stoichiometric amount. The mixture was heated to 600° C. for 4 hours, and the heated mixture was fired at 750° C. for 24 hours under atmospheric conditions. Thus fired product was slowly cooled to room temperature at a rate of 2° C./min. The cooled product was again pulverized in an automatic mortar to give a powdery product having a primary particle size of 0.5 $\mu$m and a secondary particle size of 8 to 20 $\mu$m (median size: 12.5 $\mu$m). BET specific surface area was 2 to 4 m$^2$/g, which depended upon the pulverizing conditions.

The crystal structure and composition of the resulting product was identified using ICP and X-ray diffraction measurement, which indicated that the fired product was $Li_{1.02}Mn_{1.95}Co_{0.02}O_{4.2}$ having a spinel crystal structure. The X-ray diffraction measurement indicated that the half width of the diffraction peak at $2\theta=36°$ (Cu $\alpha$-rays) was approximately 0.3, and its strength was 27% of the peak at $2\theta=18.6°$. The lattice constant of "a" axis of the crystal was 8.22 Å. Further, it was revealed that the fired product contained a small amount of $LiMnO_2$. Five grams of the fired product was dispersed in 100 mL of pure water and pH value of the dispersion was measured to give pH 8.0.

(2) $LiMn_2O_4$ (Compound C-0 for reference)

The above-mentioned procedures were repeated except that cobalt carbonate was not employed, and the lithium hydroxide and EMD were employed at a ratio of 1:2 to give $LiMn_2O_4$ (Compound C-0).

(3) $Li_{1.02}Mn_{1.95}Fe_{0.05}O_4$ (Compound C-2)

$Li_{1.02}Mn_{1.95}Cr_{0.05}O_4$ (Compound C-3)

$Li_{1.02}Mn_{1.95}Cu_{0.05}O_4$ (Compound C-4)

$Li_{1.02}Mn_{1.95}Al_{0.05}O_4$ (Compound C-5)

$Li_{1.02}Mn_{1.95}Mg_{0.05}O_4$ (Compound C-6)

$Li_{1.02}Mn_{1.95}Na_{0.05}O_4$ (Compound C-7)

$Li_{1.02}Mn_{1.95}Nb_{0.05}O_4$ (Compound C-8)

The procedures of (1) above were repeated using independently $Fe_2O_3$, $Cr_2O_3$, CuO, $Al_2O_3$, MgO, $Na_2CO_3$, and $Nd_2O_3$ in place of cobalt carbonate, to give the above-mentioned compounds C-2 to C-8.

(4) $Li_2CoO_2$ (Compound C-9; sub-active material for positive electrode)

A mixture of $Co_3O_4$ and $Co_2O_3$ and lithium carbonate were mixed in a molar ratio of 1.05 (Li/Co). The resulting mixture was fired at 600° C. for 4 hours and subsequently at 880° C. for 8 hours in an atmospheric condition. The fired product was pulverized in an automatic mortar to give a powdery product having a median size of 6 $\mu$m and BET specific surface area of 0.5 m$^2$/g. X-Ray diffraction analysis indicated that the fired product was $LiCoO_2$. pH value determined in the above-described method was 10.5.

(5) $LiNi_{0.8}Co_{0.2}O_2$ (Compound C-10; sub-active material for positive electrode)

Nickel hydroxide was added to the mixture of the (4) above and firing was performed at 800° C. for 48 hours in an oxygen atmosphere to give the $LiNi_{0.8}Co_{0.2}O_2$.

(6) Positive electrode sheet

The compound C-1 (87 wt. %), flake graphite (6 wt. %), acetylene black (3 wt. %), and a binder (composition of 3 wt. % of polytetrafluoroethylene in water and 1 wt. % of sodium polyacrylate) were kneaded after addition of water. The resulting slurry was coated on both sides of an aluminum film (thickness: 30 $\mu$m). The coated aluminum film was dried, pressed and heated to approx. 240° C. for 20 minutes to give the desired positive electrode mixture sheet (coated amount: approximately 340 g/m$^2$, thickness: approximately 120 $\mu$m).

Preparation of Secondary Battery of Cylinder Form
[Referential Battery No. 1]

The positive electrode mixture sheet obtained above was cut to give a strip having a width of 35 mm, and the negative electrode mixture sheet obtained above was cut to give a strip having a width of 39 mm. To the ends of respective sheets were spot-welded leading plates of aluminum and nickel, respectively, and dehydrated and dried at 150° C. for 2 hours in a dry atmospheric condition of a dew point of −40° C.

Both electrode sheets were installed in a nickel-plated iron cylinder battery container, in the manner as illustrated in the attached Figure. The separator was a porous polypropylene film (Cellgard 2400, available from Cellanese Corporation). In the container which also served as the negative electrode terminal, an electrolytic solution of 1 mole of $LiPF_6$ in one liter of a mixture of ethylene carbonate, butylene carbonate and dimethyl carbonate (2:2:6, volume ratio) was placed. The battery cap was fixed via a gasket. The positive electrode terminal and the positive electrode mixture sheet, as well as the negative electrode terminal and the container, were connected to each other.

The resulting battery had a diameter of 14 mm and a height of 50 mm. The battery was equipped with a safety valve.

Thus, a battery containing the electrode sheets in the container at a packing ratio of 85% was obtained.

[Referential Batteries No. 2 to No. 10]

Referential batteries No. 2 to No. 10 were prepared in the same manner as above, except that the compound C-1 was replaced with one of the compounds C-2 to C-8, or a combination of the compounds C-1 and C-9 (2:1, by weight), or a combination of the compounds C-1 and C-10 (2:1, by weight), and the compound A-1 was replaced with the compound A-2 or A-3, as is set forth in Table 2.

[Referential Batteries No. 11 to No. 15]

Referential batteries No. 11 to No. 15 were prepared in the same manner as above, except that the negative electrode sheet having a carbonaceous negative electrode active material was employed, as is set forth in Table 2.

[Batteries No. 16 to 25, According to Invention]

(1) Formation of protective layer on the positive electrode sheet

A mixture of powdery alumina ($Al_2O_3$, a mixture of a powder of mean size of 0.5 $\mu$m and a powder of mean size of 5 $\mu$m) and powdery titanium dioxide ($TiO_2$, mean size: 5 $\mu$m), 1:1 by weight, was dispersed in water, and to the resulting aqueous dispersion were added 1.3 wt. % (per the whole solid content of the resulting protective layer, the same hereinafter) of carboxymethyl cellulose (CMC, thickening agent), 0.5 wt. % of a nonionic surface active agent, and 2 wt. % (as solid content) of PVDF powder (mean size: 0.5 μm). The resulting mixture was well mixed using a homogenizer to give a coating mixture for a protective layer. The coating mixture was coated on both sides of the positive electrode sheet obtained above to form a protective layer of 15 μm thick on each surface of the positive electrode sheet.

(2) Manufacture of secondary battery

A secondary battery was prepared in the same manner as described in Referential Battery No. 1, using one of the positive electrode sheet with a protective layer and one of the negative electrode sheet with a lithium alloy layer (or a layer of a metal alloy into which a lithium ion can be intercalated).

Evaluation of Lithium Ion Secondary Battery (1) Discharge capacity

The above lithium ion secondary battery was allowed to stand overnight at room temperature, and was evaluated in its discharge capacity by repeated charge-discharge cycles under the conditions that the voltage at which the charge was stopped at 4.2 volts, the voltage at which the discharge was stopped at 3.0 volts, and electric currents for the charge-discharge were 1 mA/cm².

(2) Cycle life

The lithium ion secondary battery was subjected to repeated charge-discharge cycles at room temperature under conditions that the voltage at which the charge was stopped at 4.0 volts, the voltage at which the discharge was stopped at 3.0 volts, and electric currents for the charge-discharge were 2.0 A. The cycle life was determined when the discharge capacity decreased to 70% of the initial discharge capacity or the sudden decrease of discharge capacity due to production or growth of lithium metal dendrite or other troubles was observed.

Table 2 indicates the combinations of the precursors of the positive and negative electrode active materials, the discharge capacity, and the cycle capacity retention (% after 100 cycles).

TABLE 2

| No. | Positive electrode | Negative electrode | Discharge capacity(Ah) | Cycle Life (repeated cycle) |
|---|---|---|---|---|
| Referential | | | | |
| 0 | C-0 | A-1 | 1.20 | 110 |
| 1 | C-1 | A-1 | 1.15 | 100 |
| 2 | C-2 | A-3 | 1.14 | 110 |
| 3 | C-3 | A-2 | 1.11 | 120 |
| 4 | C-4 | A-6 | 1.11 | 120 |
| 5 | C-5 | A-4 | 1.10 | 95 |
| 6 | C-6 | A-7 | 1.10 | 100 |
| 7 | C-7 | A-5 | 1.00 | 120 |
| 8 | C-8 | A-6 | 1.10 | 100 |
| 9 | C-1/9 | A-1 | 1.25 | 130 |
| 10 | C-1/10 | A-1 | 1.28 | 100 |
| 11 | C-1 | carbon | 1.42 | 210 |
| 12 | C-2 | carbon | 1.43 | 230 |
| 13 | C-3 | carbon | 1.44 | 250 |
| 14 | C-4 | carbon | 1.41 | 200 |
| 15 | C-5 | carbon | 1.42 | 200 |
| Invention (Protective layer on positive electrode) | | | | |
| 16 | C-1 | A-1 | 1.25 | 200 |
| 17 | C-2 | A-3 | 1.20 | 210 |
| 18 | C-3 | A-2 | 1.15 | 200 |
| 19 | C-4 | A-6 | 1.15 | 200 |
| 20 | C-5 | A-4 | 1.11 | 280 |
| 21 | C-6 | A-7 | 1.11 | 230 |
| 22 | C-7 | A-5 | 1.10 | 180 |
| 23 | C-8 | A-6 | 1.10 | 210 |

TABLE 2-continued

| No. | Positive electrode | Negative electrode | Discharge capacity(Ah) | Cycle Life (repeated cycle) |
|---|---|---|---|---|
| 24 | C-1/9 | A-1 | 1.10 | 300 |
| 25 | C-1/10 | A-1 | 1.10 | 280 |

The results set forth in Table 2 indicate that the lithium ion secondary battery of the invention which employs a positive electrode having a protective layer thereon and a negative electrode layer of a lithium alloy or a metal allow into which a lithium ion can be intercalated is superior in both the discharge capacity and cycle life to a known lithium ion secondary battery which employs a positive electrode having no protective layer thereon and a negative electrode layer of a lithium alloy or a metal allow into which a lithium ion can be intercalated, or a known lithium ion secondary battery which employs a carbonaceous material as a negative electrode active material.

What is claimed is:

1. A lithium ion secondary battery comprising a positive electrode, a negative electrode, a non-aqueous electrolyte, a container sealing the electrodes and electrolyte therein, wherein the positive electrode comprises a positive electrode active material having a spinel structure and the formula:

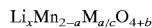

$Li_xMn_{2-a}M_{a/c}O_{4+b}$

Wherein M is cation of a metal other than Li and Mn; x, a and b are numbers satisfying the conditions of $0.1 < x \leq 1.2$, $0 \leq a < 2.0$, $1 \leq c \leq 3$, and $0 \leq b < 0.3$, respectively, during its charge-discharge cycle;

the positive electrode is coated with a non-electron conductive protective layer comprising particles of a metal oxide and a polymer binder; and the negative electrode comprises a negative electrode active material of a lithium alloy or an alloy into which a lithium ion can be intercalated.

2. The lithium ion secondary battery of claim 1, wherein "a" of the formula satisfies the condition of $0 < a \leq 0.1$.

3. The lithium ion secondary battery of claim 1, wherein "x" and "a" of the formula satisfy the conditions of $0.1 < x < 1.0$ and $0 < a \leq 0.1$, respectively.

4. The lithium ion secondary battery of claim 1, wherein "a" of the formula satisfies the condition of $0 < a \leq 0.1$, and "M" is cation of a transition metal selected from the group consisting of Co, Ni, Fe, Cr, Cu and Ti.

5. The lithium ion secondary battery of claim 1, wherein "a" of the formula satisfies the condition of $0 < a \leq 0.1$, and "M" is cation of a transition metal selected from the group consisting of Zr and Nb.

6. The lithium ion secondary battery of claim 1, wherein "a" of the formula satisfies the condition of $0 < a \leq 0.1$, and "M" is cation of a lanthanoid.

7. The lithium ion secondary battery of claim 1, wherein "a" of the formula satisfies the condition of $0 < a \leq 0.1$, and "M" is a cation of an alkali or alkaline earth metal selected from the group consisting of Na, K, Mg, Ca and Cs.

8. The lithium ion secondary battery of claim 1, wherein the non-electron conductive protective layer comprises particles of a metal oxide selected from the group consisting of aluminum oxide, titanium dioxide and zirconium oxide.

9. The lithium ion secondary battery of claim 1, wherein the negative electrode active material comprises a lithium-containing or non-lithium-containing metal alloy of elements selected from the group consisting of aluminum, magnesium, boron, antimony, bismuth, silicon, germanium, copper, titanium, gallium, and indium.

10. The lithium ion secondary battery of claim 1, wherein the negative electrode active material comprises a metal alloy of lithium and tin.

11. The lithium ion secondary battery of claim 1, wherein the negative electrode active material comprises an amorphous metal.

12. The lithium ion secondary battery of claim 1, wherein the non-aqueous electrolyte comprises a mixed solvent of ethylene carbonate and at least one other carbonate selected from the group consisting of diethyl carbonate and dimethyl carbonate, and a supporting salt comprising $LiPF_6$.

13. The lithium ion secondary battery of claim 1, wherein the container is in the form of a cylinder.

14. The lithium ion secondary battery of claim 1, wherein the metal oxide is present in the protective layer in an amount of not less than 70 weight % and not more than 99 weight %.

15. The lithium ion secondary battery of claim 1, wherein the protective layer has a thickness in the range of 1 to 20 μm.

* * * * *